United States Patent [19]

Balanson et al.

[11] 4,258,146

[45] Mar. 24, 1981

[54] ORGANIC FILLERS FOR ELASTOMERS

[75] Inventors: Richard D. Balanson, Morgan Hill; James Economy, San Jose, both of Calif.; Samuel J. Huang, Storrs, Conn.; Thor L. Smith, Los Altos Hills, Calif.

[73] Assignee: International Business Machines Corporation, Armonk, N.Y.

[21] Appl. No.: 79,660

[22] Filed: Sep. 28, 1979

[51] Int. Cl.$^3$ .................. C08L 83/06; C08L 83/10
[52] U.S. Cl. .................. 525/106; 204/159.13; 525/105; 525/431; 525/474
[58] Field of Search .......... 525/105, 106, 431, 931, 525/474; 204/159.13

[56] References Cited

U.S. PATENT DOCUMENTS

| 2,838,469 | 6/1958 | Buselli et al. | 525/931 |
|---|---|---|---|
| 3,627,836 | 12/1971 | Getson | 204/159.13 |
| 3,736,290 | 5/1973 | Fessler | 525/431 |
| 3,962,519 | 6/1976 | Rüsch et al. | 428/409 |
| 3,989,768 | 11/1976 | Milkovich et al. | 525/271 |
| 4,014,851 | 3/1977 | Bluestein | 260/42.26 |
| 4,042,441 | 8/1977 | Wasserman et al. | 260/825 |

*Primary Examiner*—Wilbert J. Briggs, Sr.
*Attorney, Agent, or Firm*—Joseph G. Walsh

[57] ABSTRACT

Organic prepolymer fillers capable of curing and reacting chemically with elastomers to form covalent bonds therewith are mixed with elastomers to form reinforcing domains with diameters of from 0.01 to about 50 microns, and when the mixture is cured, the mechanical strength of the elastomer is increased. In many cases, the thermal stability and/or the hydrolytic stability will also be increased.

8 Claims, No Drawings

ORGANIC FILLERS FOR ELASTOMERS

DESCRIPTION

Technical Field

The present invention is concerned with a process for treating elastomers by adding organic prepolymer fillers thereto. In particular, the present invention provides a process for improving the mechanical strength of the elastomer. In many cases, the thermal stability or hydrolytic stability will also be increased. Improvement of such properties is the chief object of the present invention.

Background Art

Many elastomeric materials are mechanically very weak. In the past fillers have been added in an attempt to increase the mechanical strength of elastomers. The art is replete with the addition of inorganic fillers to elastomers. Such inorganic fillers are obviously distinguished from the organic prepolymer fillers of the present invention. Although inorganic fillers such as colloidal silica can improve mechanical properties of elastomers, they have the disadvantage of catalyzing decomposition of the resins at high temperatures.

U.S. Pat. No. 3,627,836 teaches the use of grafting monomers which have been generated in situ. This grafting, of course, is distinguished from the present invention in that the reference does not show the use of a filler. Furthermore, unlike the present invention, separate phases are not formed.

U.S. Pat. No. 3,962,519 shows a rubber material having an organic silicon compound incorporated therein. There is, however, no chemical bonding between the silicon compound and the rubber material.

U.S. Pat. No. 4,014,851 teaches in situ polymerization of finely divided solid particles dispersed in a vinylorganopolysiloxane fluid. The patent, however, is concerned solely with dispersions in liquid and does not disclose organic fillers for an elastomer.

U.S. Pat. No. 4,042,441 is concerned with bonding a solid rocket propellant to a silicone rubber liner by means of a long chain polymer. The disclosure, however, no way addresses the problem of providing an organic filler for an elastomer.

Disclosure of the Invention

According to the present invention, the mechanical strength of elastomers is increased by adding organic prepolymer fillers to the elastomer. The organic prepolymer filler should be dispersed throughout the elastomer as a separate phase comprising reinforcing domains having diameters of from 0.01 to about 50 microns. This dispersion is accomplished in either of two ways. The filler and the elastomer can be dissolved in a mutual solvent, and then, upon evaporation of the solvent, the filler will separate into separate domains. A second method is to choose a filler which is insoluble in the solvent used to dissolve the elastomer. The filler is then, for example, by mechanical means, treated until it has the desired particle size, and mixed with the elastomer.

The elastomer and the filler are picked so that they are mutually reactive to form covalent bonds between them. It should be emphasized that the bonds must be covalent. The covalent bonds may be carbon to carbon bonds or carbon to heteroatom or heteroatom to heteroatom. The important point is that they are covalent.

The organic filler is a prepolymer. That is to say, upon curing, the molecular weight of the prepolymer increases. Furthermore, because of the reactivity of the prepolymer with the elastomer, curing also leads to formation of covalent bonds between the filler and the elastomer.

The curing may satisfactorily be accomplished by methods known to the prior art. For example, heating may successfully by used. Alternatively, exposure to radiation such as light may be employed. Still another method is by chemical means, particularly the addition of catalysts.

The process of the present invention is applicable to any elastomer which posesses functionality, and which is capable of reacting with the selected prepolymer filler. In particular, the process of the present invention gives outstandingly good results when the elastomer is a silicone rubber.

Many types of prepolymers are useful as the filler in the present invention, provided that they contain the required functionality to react with the elastomer to form covalent bonds. Particularly useful fillers include low molecular weight polyimides, and also polyacetylene prepolymers having a molecular weight of about 800. Such organic fillers have given outstandingly good results, in particular with silicone rubber. The optimum amount of additive filler will vary with the particular elastomer and with the particular filler. In general, the filler should be present in an amount between from about 1 to about 40% by weight of the elastomer. In general from about 5 to about 20% is preferred.

In cases where it is desired to increase the thermal resistance of an elastomer, the filler should be a prepolymer which polymerizes to a polymer having a glass transition temperature at least fifty centigrade degrees above the temperature at which it is desired to use the treated elastomer.

EXAMPLE I

A low molecular weight polyimide prepolymer is used as a filler for a silicone rubber. The polyimide is a commercially available material with an average molecular weight of 1100 (Trade name Thermid—600). It has been precipitated and ground to a uniform particle size of approximately 0.5 microns. It contains reactive acetylene units on both ends of the prepolymer. The material is insoluble in the commonly used solvents which dissolve the silicone resin. The silicone rubber (GE-SE-33) contains vinyl groups which are used to cross-link the resin and thus form an elastomer. The composition is formulated by dissolving the silicone resin in tetrahydrofuran (THF) and dispersing the polyimide in it by means of sonication. Upon loss of the solvent, the organic filler forms discrete domains within the rubber matrix. The composition is cured by either heating in an oxygen-free environment for six hours at 300° C., or by the addition of a peroxide catalyst, followed by UV or thermal treatment. The following table shows the mechanical properties of the composition as a function of polyimide concentration.

| Percentage Filler | Modulus (PSI) | Tensile Strength | Elongation at Break |
|---|---|---|---|
| 0% | 12 | 15 | 100% |
| 2% | 109 | 81 | 195% |

| Percentage Filler | Modulus (PSI) | Tensile Strength | Elongation at Break |
|---|---|---|---|
| 4% | 131 | 105 | 225% |
| 6% | 117 | 105 | 250% |
| 8% | 177 | 127 | 180% |

EXAMPLE II

A filler which is a polydiacetylene prepolymer having a molecular weight of 800 is used with the elastomer described above. This filler will self-cure at 190° C. or higher or upon exposure to UV. The cured polymer has a high glass transition (greater than 250° C.) and thermal stability to temperatures above 500° C. This prepolymer is soluble in THF, and can be formulated with the silicone resin to form a homogeneous solution. When the solution is cast and the solvent allowed to evaporate, the polyacetylene phase separates. The composite can then be cured in a way that is similar to the polyimide discussed in Example I above. The properties of the resulting rubbers are listed below:

| Percentage Filler | Modulus (PSI) | Tensile Strength | Elongation at Break |
|---|---|---|---|
| 0% | 12 | 15 | 100% |
| 5% | 147 | 77 | 235% |
| 10% | 162 | 100 | 260% |
| 15% | 180 | 140 | 340% |
| 20% | 320 | 144 | 275% |

In addition to the dramatic improvement in mechanical properties of the resin, these compositions show dramatically improved thermal and hydrolytic stability as shown below:

| Filler | Weight loss after 7 days at 250° C. in an $H_2O$ Saturated $N_2$ Atmosphere | % change in Modulus |
|---|---|---|
| 6% inorganic ($SiO_2$) | 22% | −25% |
| 10% polyimide | 2.7% | −15% |
| 10% diacetylene | 3.1% | −4% |

We claim:
1. A process for increasing the mechanical strength of an elastomer, said process comprising the steps of:
    (1) forming a mixture of a silicone rubber elastomer containing reactive functionality with from about 1% to about 40% by weight of an organic prepolymer filler which contains functionality to react with said elastomer,
    (2) separating said filler into a separate phase of reinforcing domains having diameters of from 0.01 to about 50 microns dispersed throughout said elastomer,
    (3) curing the mixture to advance the molecular weight of the prepolymer filler and to bond it by covalent bonds to the elastomer.
2. A process as claimed in claim 1 in which the prepolymer filler is a low molecular weight polyimide.
3. A process as claimed in claim 1 wherein the prepolymer filler is a polydiacetylene prepolymer having a molecular weight of about 800.
4. A process as claimed in claim 1 wherein the mixing is accomplished by dissolving the elastomer and the prepolymer filler in a mutual solvent.
5. A process as claimed in claim 1 wherein the prepolymer filler having a particle size of from 0.01 to 50 microns in diameter, is physically mixed with the elastomer.
6. A process as claimed in claim 1 wherein the curing is accomplished by heating.
7. A process as claimed in claim 1 wherein the curing is accomplished by light.
8. A process as claimed in claim 1 wherein the curing is accomplished by chemical means.

* * * * *